United States Patent
Yuchimiuk et al.

(10) Patent No.: US 6,823,313 B1
(45) Date of Patent: Nov. 23, 2004

(54) METHODOLOGY FOR DEVELOPING INTERACTIVE SYSTEMS

(75) Inventors: John J. Yuchimiuk, Reading, PA (US); David L. Ferro, Ogden, UT (US); Daythal L. Kendall, Glenside, PA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/417,166

(22) Filed: Oct. 12, 1999

(51) Int. Cl.[7] .............................................. G10L 21/00
(52) U.S. Cl. ..................... 704/275; 704/270; 704/257; 704/270.1
(58) Field of Search ............................... 704/270, 272, 704/275, 270.1, 257

(56) References Cited

U.S. PATENT DOCUMENTS

| | | | | |
|---|---|---|---|---|
| 5,493,608 A | * | 2/1996 | O'Sullivan | 379/88.04 |
| 5,730,603 A | * | 3/1998 | Harless | 434/308 |
| 5,774,860 A | * | 6/1998 | Bayya et al. | 704/275 |
| 5,794,204 A | * | 8/1998 | Miyazawa et al. | 704/275 |
| 5,983,190 A | * | 11/1999 | Trower et al. | 704/276 |
| 6,044,347 A | * | 3/2000 | Abella et al. | 704/272 |
| 6,321,198 B1 | * | 11/2001 | Hank et al. | 704/270 |
| 6,330,539 B1 | * | 12/2001 | Takayama et al. | 704/275 |
| 6,418,440 B1 | * | 7/2002 | Kuo et al. | 707/10 |
| 6,604,094 B1 | * | 8/2003 | Harris | 706/48 |
| 6,665,640 B1 | * | 12/2003 | Bennett et al. | 704/257 |

* cited by examiner

*Primary Examiner*—Vijay Chawan
(74) *Attorney, Agent, or Firm*—Michael B. Atlass; Mark T. Starr; Woodcock Washburn LLP

(57) ABSTRACT

A method is provided for developing a computer-based dialogue interface for an automated or computerized system using input device technology. The dialogue interface is disposed between the automated system and an end user, with the dialogue interface receiving input from the end user and providing output to the end user in response to the input. In an illustrative embodiment, the method comprises the following steps. A system designer(s) defines a plurality of requirements applicable to the dialogue interface. The dialogue interface is then designed to meet these requirements. The automated system is simulated with at least a first person, and the end user is simulated with at least a second person. The dialogue interface is evaluated by facilitating an interaction between the first and the second persons through the dialogue interface. Based on the interaction between the first and the second persons, the dialogue interface is evaluated. Based on the evaluation of the dialogue interface, the dialogue interface is refined. After performing the above steps, the automated system is then developed based upon the dialogue interface.

55 Claims, 6 Drawing Sheets

METHODOLOGY FOR DEVELOPING INTERACTIVE SYSTEMS

BACKGROUND OF THE DISCLOSURE

Description of Related Art

FIG. 1 is a diagram of a typical software development lifecycle, not necessarily limited to speech recognition systems. At block 10, a software design team defines the requirements applicable to a given computer software system. The term "team" here refers to either an individual designer or to a group of designers working in concert. These requirements drive the design of the software system, as illustrated in block 12. After designing the system, the design team develops and implements a prototype system to fulfill those requirements, as shown in block 14. If the development stage reveals any design errors, the team returns to block 12 to correct those design errors. Typically, the design and development stages illustrated in blocks 12 and 14 entail significant investments of time and money.

At block 16, the prototype system is tested to ensure that it meets the requirements defined in block 10. In some circumstances, the testing shown in block 16 reveals design errors in the prototype system, and the design team must refine the system as shown in block 18 to identify fixes for those design errors. To identify these fixes, the design team may have to address either the design or the implementation of the system, shown in blocks 12 and 14, respectively. Once correct fixes are identified, the team returns either to block 12 or to block 14 to implement these fixes, depending on whether the system design (block 12) or the system implementation (block 14) must be addressed. The process is repeated until testing reveals that the system meets all applicable requirements. At this point, the system is considered completed, as shown in block 20.

As a general rule, whether developing speech recognition systems or other types of software, the later in the project development lifecycle that a design error is found, the more expensive it is to fix that design error. This general rule holds not only because fixing one design error may have a "ripple effect" of creating additional design errors, but also because the system must be regression tested after the fix to ensure that fixing the first design error did not create other design errors. For example, if it costs a certain amount of money, X dollars, to fix a design error located during the design stage (block 12), it generally costs three times that amount of money, 3X dollars, to fix that same design error located in the development stage (block 14). Furthermore, if that same design error is initially located in the test stage (block 16), it costs about nine times that amount of money, 9X dollars, to fix that design error. Clearly, from a project management standpoint, it is advantageous to locate design errors as early in the project development lifecycle as possible. The cost of finding and fixing a design error grows exponentially in relation to the phase of a project in which the design error is located.

One drawback to the paradigm shown in FIG. 1 is that it does not typically locate system design errors early in the project lifecycle, that is before substantial resources, including time and money, have already been expended on the project. Note that the testing activities shown in block 16 typically do not occur chronologically until after the design and development stages, shown in block 12 and 14 respectively, have been completed to provide a functioning prototype. In more traditional software engineering methodologies, the design underlying the software system cannot be rigorously tested until the functioning prototype has been implemented. To implement such a prototype entails a significant investment of time and money. Accordingly, by the time the prototype system is ready for testing (block 16), significant time and money have already been invested in designing and developing the prototype system. Typically, the bulk of system design errors are located during the test stage (block 16), and as discussed above, design errors located during this stage are the most expensive to fix, because the design and development stages are already thought to be substantially complete.

In light of the above disadvantages of the software development lifecycle shown in FIG. 1, it would be advantageous to provide the capability to test the design before implementing a functioning prototype and before the design and development stages are substantially completed or have even begun. In this manner the testing step is moved earlier in the development methodology, where design errors are cheaper to fix. Accordingly, a need exists in the art for a software design methodology that promotes the location of system design errors relatively early in the project lifecycle, when such design errors are relatively inexpensive to fix. In addition to reducing the cost of locating and fixing errors, such a methodology would also reduce overall project cost in terms of both time and money. However, such a methodology would further provide the ability to evaluate designs using correct and appropriate physical senses, would improve the odds of overall project success, and would improve the chances of ultimate customer acceptance and understanding.

SUMMARY

The present invention is directed to a method of developing a computer-based dialogue interface for an automated or computerized system. The dialogue interface is disposed between the automated system and an end user, with the dialogue interface receiving input from the end user and providing output to the end user in response to the input. In an illustrative embodiment, the method comprises the following steps. A system designer(s) defines a plurality of requirements applicable to the dialogue interface. The dialogue interface is then designed to meet these requirements. The automated system is simulated with at least a first person, and the end user is simulated with at least a second person. The dialogue interface is evaluated by facilitating an interaction between the first and the second persons through the dialogue interface. Based on the interaction between the first and the second persons, the dialogue interface is evaluated. Based on the evaluation of the dialogue interface, the dialogue interface is refined.

After performing the above steps, the automated system is then developed based upon the dialogue interface.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings an illustrative embodiment, it being understood, however, that the invention is not limited to the specific methods and instrumentalities disclosed. In the drawings.

DETAILED DESCRIPTION OF ILLUSTRATIVE EMBODIMENTS

Figure 2:
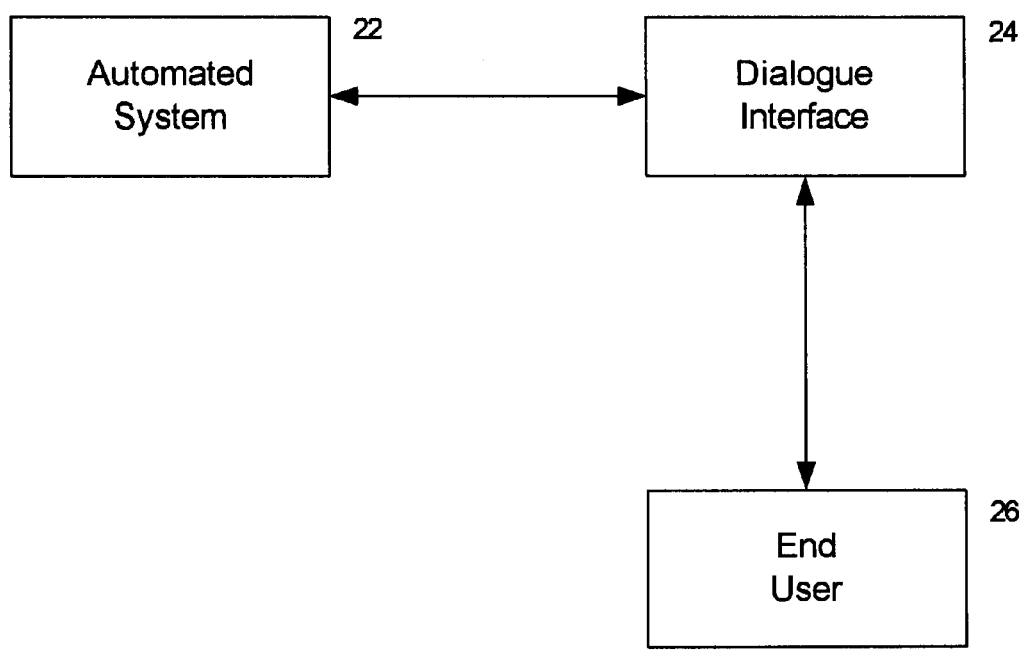
FIG. 2 is a schematic diagram of how an illustrative embodiment of the invention interacts with its operational environment.

Referring to the drawings, wherein like numerals represent like elements throughout, FIG. 2 is a schematic diagram of how an illustrative embodiment of the invention, dialogue interface 24 interacts with its operational environment, which includes an automated system 22 and an end user 26. In this illustrative embodiment, the automated system 22 may be an enterprise-class server that handles bulk transaction processing. Typically, automated system 22 provides centralized processing power adapted for a given application. The end user 26 typically is the customer that ultimately interacts with the automated system 22. The dialogue interface 24 constructed according to an illustrative embodiment then serves to translate commands from end user 26 into commands to automated system 22. The dialogue interface 24 serves as an application that is disposed between the automated system 22 and an end user 26, with the dialogue interface 24 receiving input from the end user 26 and providing output to the end user 26 in response to the input. Illustrative applications for the invention might include, but are not limited to, order-taking for fast food restaurants, ticket reservations for airlines, phone answering for customer service personnel, or other similar customer-service applications.

There are at least three purposes for an application, such as the dialogue interface 24. First, the dialogue interface 24 can enable the automated system 22 to obtain information from the end user 26. Second, the dialogue interface 24 can enable the end user 26 to obtain information from the automated system 22, such as in a self-service or customer-service context. Finally, the dialogue interface 24 can enable any combination of the above two functions.

Additionally, there are at least three ways for an application, such as the dialogue interface 24, to be interacted with. First, the automated system 22 can initiate a transaction through the dialogue interface 24, in a directed dialogue mode. Second, a caller, acting as the end user 26, can initiate a transaction through the dialogue interface 24. Third, the caller can initiate a transaction through the dialogue interface 24, and the automated system 22 can ask for any missing, necessary, information, in an adaptive mode.

Figure 3:
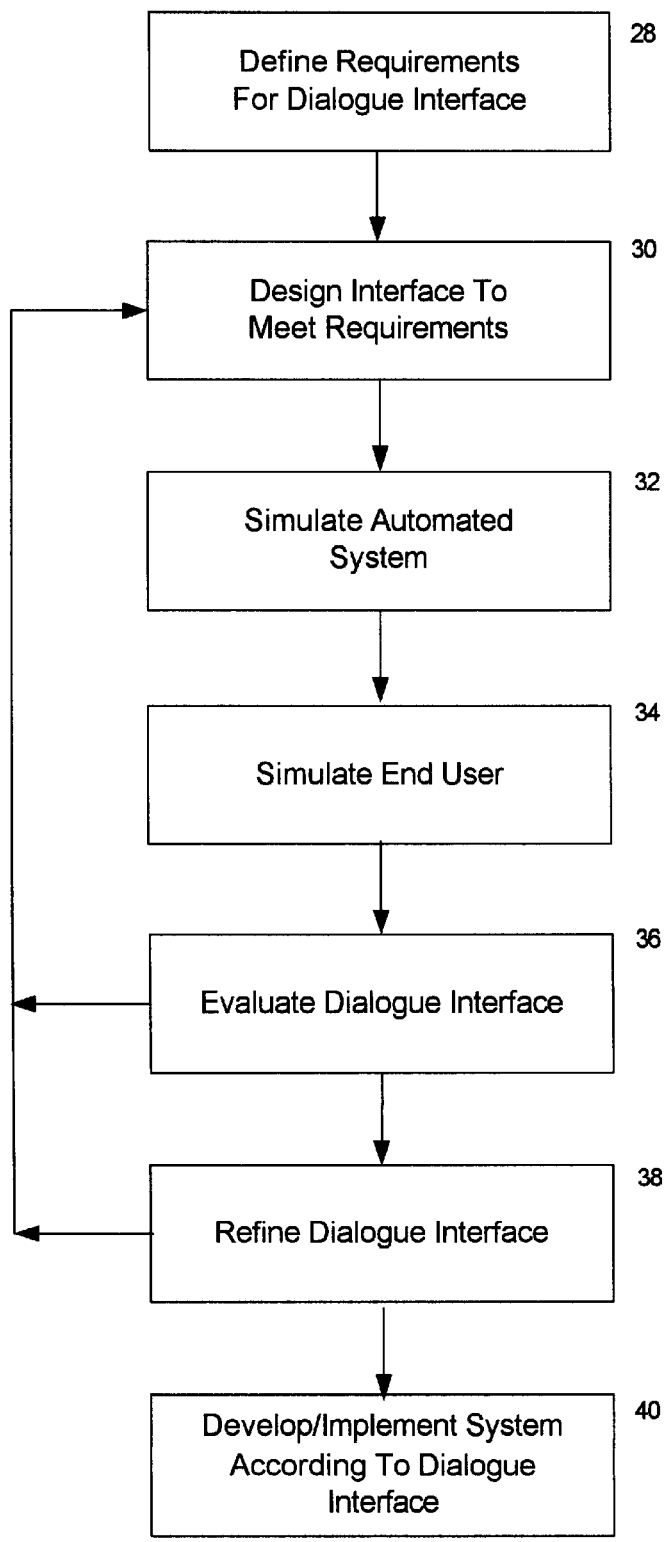
FIG. 3 is a flowchart of the steps comprising an illustrative embodiment of the invention.

FIG. 3 is a flowchart of the steps comprising an illustrative method of the invention. In an illustrative embodiment, the method comprises the following steps. A system designer(s) defines a plurality of requirements applicable to the dialogue interface (Block 28). The dialogue interface is then designed to meet these requirements (Block 30). The automated system is simulated with at least a first person (Block 32), and the end user is simulated with at least a second person (Block 34). The dialogue interface is evaluated by facilitating an interaction between the first and the second persons through the dialogue interface (Block 36). Based on the interaction between the first and the second persons, the dialogue interface is evaluated. Based on this evaluation, the dialogue interface is refined (Block 38). After performing the above steps, the automated system is then developed based upon the dialogue interface (Block 40).

Figure 1:
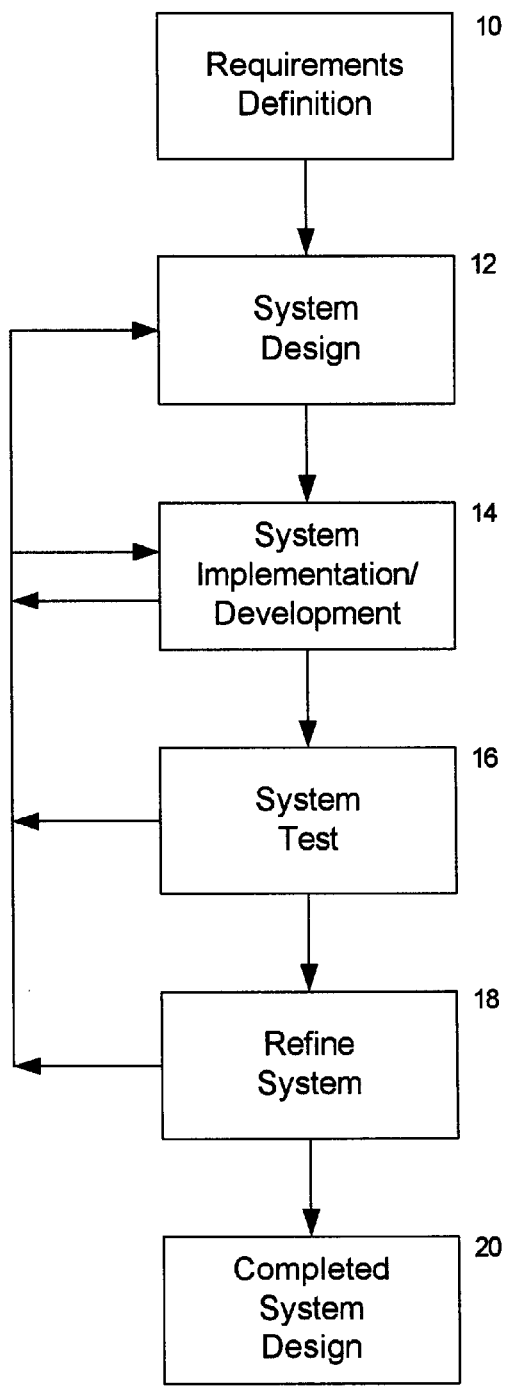
FIG. 1 is a flowchart of a conventional software development lifecycle.

Note that in FIG. 3, the implementation step 40 occurs after the evaluation step 36. In contrast, FIG. 1 shows system test step 16 after implementation step 14. Accordingly, the illustrative method of the invention as shown in FIG. 3 reveals design errors in the software much earlier in the development cycle as compared to the paradigm shown in FIG. 1.

In an illustrative embodiment of the invention, the above step of designing the dialogue interface (Block 30) can include defining a plurality of outputs, such as prompts in an illustrative embodiment, in the dialogue interface. These outputs are preferably defined to solicit information from the end user 26, or a person simulating the end user for evaluation purpose. For example, in a fast food ordering context, the end user 26 may be a customer at a drive-thru window, and the dialogue interface 24 may be responsible for taking a food order from the end user and passing the order on to the cook staff. The dialogue interface 24 specifies the information to be obtained from the end user 26 by the outputs, and the outputs can originate from the automated system 22 to be directed to the end user 26.

In further embodiments of the invention, the outputs can be arranged in a hierarchy, with various outputs seeking information at various levels of detail. Returning to the fast food example, a first set of outputs might ask the end user 26 to place an order in broad terms, such as by specifying a hamburger, fries, and drinks. Additional outputs might obtain further details related to each ordered item, such as toppings to be included or excluded, serving sizes, flavors, etc. The outputs may also be structured to ask the same question different ways, in case the end user 26 misunderstands or is confused by a given output. Also, the outputs may be adapted for the skill level of the end user 26, with a first output for inexperienced users and at least a second output for more experienced users. Generally speaking, the invention can readily support defining a first output to seek the information in a first fashion and defining a second output to seek the same information in a second fashion.

Figure 4:
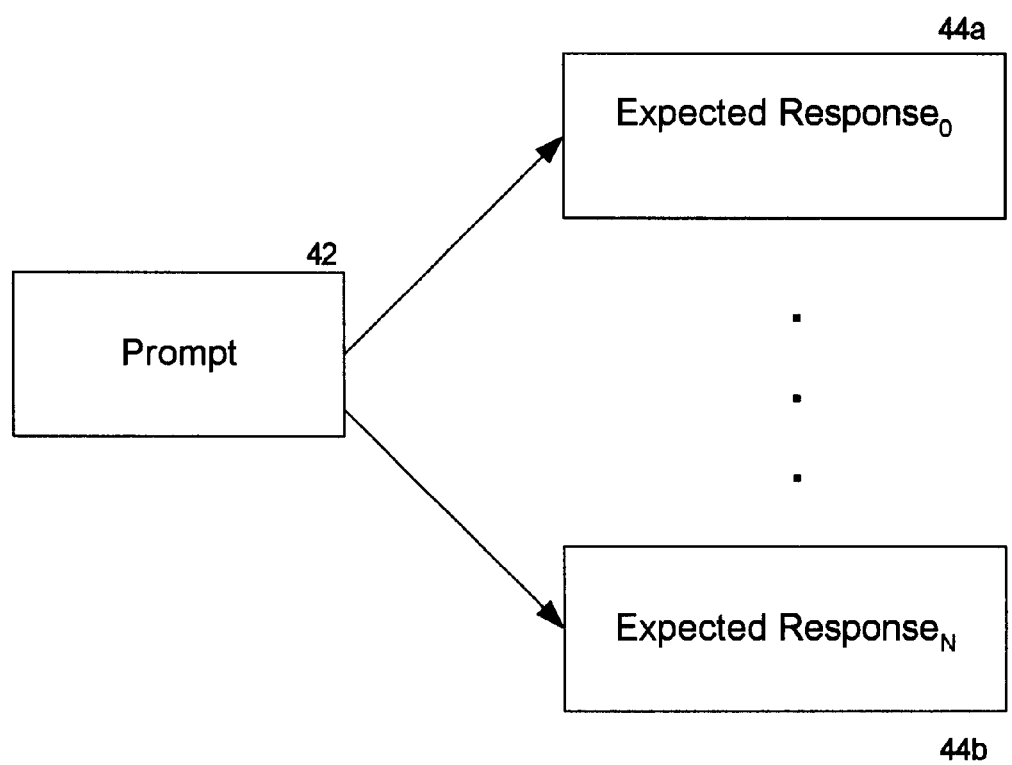
FIG. 4 is a diagram illustrating an illustrative relationship between expected responses and outputs.

Having defined the outputs as described above, the next task is to analyze how the end user 26 responds to the outputs. FIG. 4 is a diagram illustrating an illustrative relationship between expected responses and outputs. An illustrative embodiment of the invention defines a plurality of expected responses 44 to the outputs 42 in the dialogue interface 24, with at least one expected response 44 corresponding to each one of the outputs 42. Continuing the above fast food example, if a first output 42 seeks a food order, the expected responses 44 could be defined to include all of the items on the restaurant's menu. The dialogue interface 24 then compares the response from the end user 26 to the set of expected responses 44. If the response from the end user 26 is within the set of expected responses 44, the dialogue interface 24 can proceed to obtain further details on the order or to complete the order. If the response is an unexpected response that is not within the set of expected responses 44, the dialogue interface 24 may re-phrase or repeat the question in an effort to obtain a response that is within the set of expected responses 44. In certain situations, it may be advisable to add the unexpected response to the set of expected responses 44.

Figure 5:
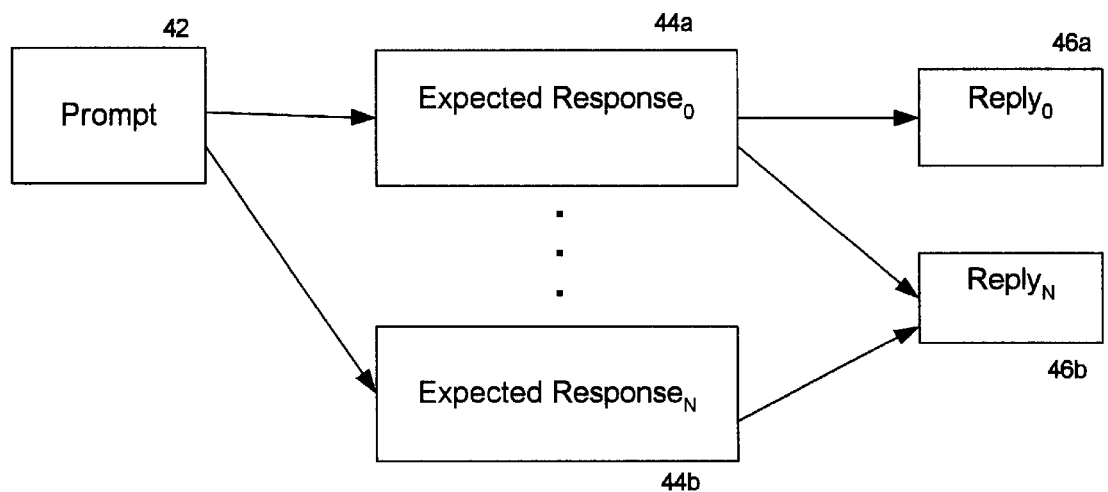
FIG. 5 is a diagram illustrating the relationship between expected responses and replies, according to an illustrative embodiment of the invention.

FIG. 5 is a diagram illustrating the relationship between expected responses and replies, according to an illustrative embodiment of the invention. In an illustrative embodiment, the method of the invention defines a plurality of replies 46 to responses from the end user. These replies may seek or provide additional information, or may rephrase a question posed by an earlier output 42. At least one of the replies 46*a* and 46*b* can correspond to each one of the expected responses 44*a* and 44*b*, or a given reply 46*a* can be related to the set of expected responses 44*a*–44*b* as a whole.

If appropriate in a given application of the invention, the dialogue interface 24 can define a formal grammar, similar to grammars used in formal language theory, that maps each output 42 to at least one expected response 44, or to a set of expected responses 44*a*–44*b*. Further, the grammar may map at least one reply 46 to one or more of the expected responses 44. It should also be understood that while FIGS. 4 and 5 illustrative two expected responses and two replies, these illustrated embodiments are merely illustrative and do not limit the invention. Specifically, one, two, or any number of expected responses or replies, may be employed, as appropriate in a given application.

According to an illustrative embodiment of the invention, the step of simulating the automated system (FIG. 3, Block 32) can include having the first person, who acts as the automated system, direct a output 42 to the second person simulating the end user 26, to seek information from the second person. The output 42 is defined by the dialogue interface 24, such as by a formal grammar. The step of simulating the end user (Block 34) can include having the second person, who acts as the end user 26, listen to the output 42 and provide a response to the output 42.

Figure 6:
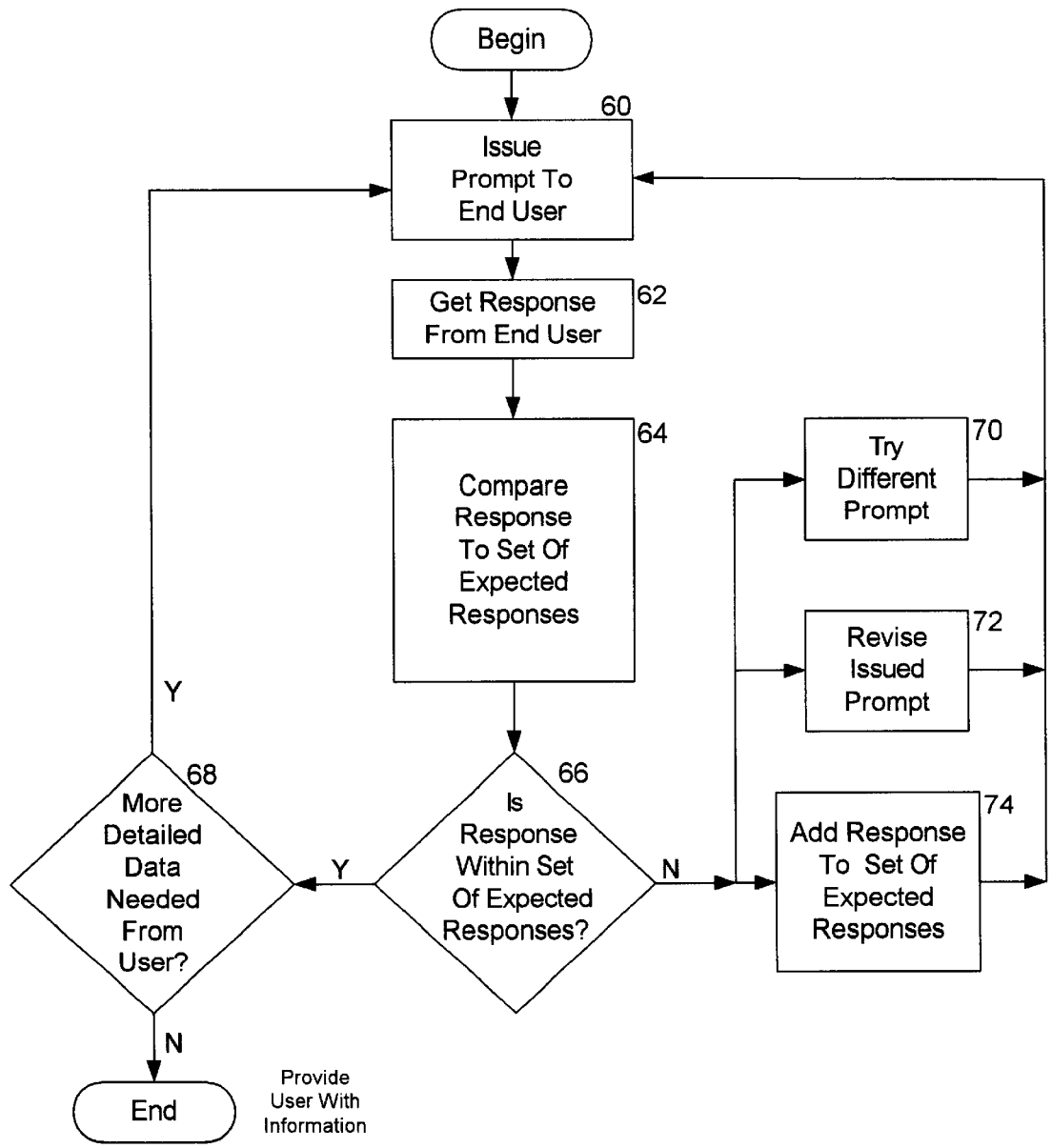
FIG. 6 is a flowchart of the steps involved in evaluating the dialogue interface according to an illustrative embodiment of the invention.

FIG. 6 is a flowchart of the steps involved in evaluating the dialogue interface 24 according to an illustrative embodiment of the invention. As discussed above, a output 42 defined by the dialogue interface 24 is issued to the end user 26, as shown in block 60. In block 62, the end user 26 responds to the output 42. In block 64, the response from the end user 26 is compared to the set of expected responses 44, as currently defined by the dialogue interface 24. If the response from the second person is not within the set of expected responses 44, then one of blocks 70, 72, or 74 is executed. In block 70, the dialogue interface may specify an alternative output to elicit a different response from the end user 26; the goal here is to try an alternative output to obtain a response that is within the set of expected responses 44. In block 72, the output 42 as defined in the dialogue interface 24 may be revised or modified as necessary to obtain a response within the set of expected responses 44. Block 72 differs from block 70 in that block 72 represents revising a given output as defined in the dialogue interface, while block 70 represents trying a second given output, without revising the first given output. Finally, in block 74, the dialogue interface 24 can be modified, if appropriate, to incorporate the response from the second person as one of the set of expected responses 44. After executing one of blocks 70, 72, and 74, the method returns to block 60 to issue a output to the end user 26.

If the response from the end user 26 is within the set of expected responses 44, then the method proceeds to block 68, where a decision is made as to whether more detailed information is needed from the end user 26. If no more information is needed from the end user 26, then the processing shown in FIG. 6 ends. Otherwise, the method returns to block 60 to obtain a more detailed output from the dialogue interface 24, and the method is repeated with this more detailed output.

In the context of this description, "outputs" are used to prompt the user for information or to provide the user with information, and "inputs" are used to direct the system or to provide the system with information.

In an illustrative embodiment of the invention, the step of simulating the automated system 22 includes providing at least one of a audible output and a visual output to the second person (simulating the end user 26) through the dialogue interface 24. Although these types of outputs are described as part of the simulation process, these are the same types of outputs in the actual run-time environment of the system when it is fully operational. Also, the step of simulating the end user 26 can include having the second person provide input to the dialogue interface 24 including, but not limited to at least one of the following means: a touch-pad, an electronic pen, a mandible-operated input device, a voice interface, an audible-sound interface, a graphic user interface, and a DTMF interface. Other similar input or output devices may be appropriate, such as those adapted for use by persons suffering any type of disability. It should also be understood that any combination of the above input and output means can be used to practice illustrative embodiments of the invention. Specifically, the invention is not limited to any particular combination of a specific input device as paired with a specific output device. Rather, the combination of input device and output device can be tailored by those skilled in the art as appropriate for any given application. These multi-modal input/output capabilities provide the system with significant flexibility in different operational environments. Also, these various input/output means may be used during the execution of blocks 60 and 62 shown in FIG. 6.

According to further illustrative embodiments of the invention, the step of refining the dialogue interface 24 (Block 38, FIG. 3) can be repeated until the response from the second person substantially matches at least one expected response 44 defined by the dialogue interface 24. Here, the term "substantially" is understood to mean that the response from the second person is close enough to one of the expected responses 44, that further iterations of the methodology would not be worthwhile. Accordingly, the response from the second person need not match one of the expected responses 44 verbatim, but need only match closely enough to have the same semantic information.

It should be understood that changes may be made to the embodiments described above without departing from the broad inventive concepts thereof. For example, the above methodology is described in the context of developing a speech recognition system. However, the same methodology may be used beneficially to develop other types of software systems as well. Accordingly, the present invention is not limited to the particular embodiments disclosed, but is intended to cover all modification that are within the spirit and scope of the invention as defined by the appended claims.

What is claimed is:

1. A method of developing a computer-based dialogue interface for an automated system, the dialogue interface being disposed between the automated system and an end user, the dialogue interface receiving input from the end user and providing output to the end user in response to the input, the method comprising the steps of (a) defining a plurality of requirements applicable to the dialogue interface;

(b) designing the dialogue interface to meet the requirements;

(c) simulating the automated system with at least a first person;

(d) simulating the end user with at least a second person;

(e) evaluating the dialogue interface by facilitating interaction between the first and second persons through the dialogue interface;

(f) evaluation the dialogue interface based on the interaction between the first and the second persons;

(g) refining the dialogue interface based on the evaluation of the dialogue interface; and (h) after performing steps (c) through (g), developing the automated system based upon the dialogue interface.

2. The method of claim 1, wherein the step of designing the dialogue interface includes defining a plurality of outputs in the dialogue interface, the dialogue interface specifying information to be elicited from the end user by the outputs, and the outputs originating from the automated system and being directed to the end user.

3. The method of claim 2, wherein the step of defining a plurality of outputs includes defining a first output to seek the information in a first fashion and defining at least a second output to seek the information in at least a second fashion.

4. The method of claim 2, wherein the step of defining a plurality of outputs includes defining a first output to seek the information in a first fashion and defining at least a second output to seek the information in at least a second fashion that is customized and specific to the end user.

5. The method of claim 1, wherein the step of designing the dialogue interface includes optionally defining a plurality of expected responses to the outputs in the dialogue interface.

6. The method of claim 1, wherein the step of simulating the automated system includes having the first person direct a output to the second person to seek information from the second person, the output being defined by the dialogue interface.

7. The method of claim 1, wherein the step of simulating the end user includes having the second person provide a response to the output.

8. The method of claim 1, wherein the step of refining the dialogue interface includes modifying the proposed dialogue interface to incorporate the response from the second person into the proposed dialogue interface.

9. The method of claim 1, wherein the step of simulating the automated system includes providing at least one of an audible output and a visual output to the second person through the dialogue interface.

10. The method of claim 1, wherein the step of simulating the end user includes having the second person provide input to the dialogue interface using at least one of the following: a touch-pad, an electronic pen, a mandible-operated input device, a voice interface, an audible-sound interface, a graphic user interface, and a DTMF interface.

11. The method of claim 1, wherein the step of refining the dialogue interface includes repeating steps (c) through (g) until the dialogue design is fully evaluated.

12. A method of developing a computer-based dialogue interface for an automated system, the dialogue interface being disposed between the automated system and an end user, the dialogue interface receiving input from the end user and providing output to the end user in response to the input, the method comprising the steps of:

(a) defining a plurality of requirements applicable to the dialogue interface;

(b) designing the dialogue interface to meet the requirements;

(c) simulating the automated system with at least a first person;

(d) simulating the end user with at least a second person;

(e) evaluating the dialogue interface by facilitating interaction between the first and second persons through the dialogue interface;

(f) evaluation the dialogue interface based on the interaction between the first and the second persons;

(g) refining the dialogue interface based on the evaluation of the dialogue interface; and (h) after performing steps (c) through (g), developing the automated system based upon the dialogue interface;

wherein the step of designing the dialogue interface includes defining a plurality of replies, at least one of the replies corresponding to each one of the expected responses and providing further information corresponding to the response.

13. The method of claim 12, wherein the step of designing the dialogue interface includes defining a plurality of outputs in the dialogue interface, the dialogue interface specifying information to be elicited from the end user by the outputs, and the outputs originating from the automated system and being directed to the end user.

14. The method of claim 13, wherein the step of defining a plurality of outputs includes defining a first output to seek the information in a first fashion and defining at least a second output to seek the information in at least a second fashion.

15. The method of claim 13, wherein the step of defining a plurality of outputs includes defining a first output to seek the information in a first fashion and defining at least a second output to seek the information in at least a second fashion that is customized and specific to the end user.

16. The method of claim 12, wherein the step of designing the dialogue interface includes optionally defining a plurality of expected responses to the outputs in the dialogue interface.

17. The method of claim 12, wherein the step of simulating the automated system includes having the first person direct a output to the second person to seek information from the second person, the output being defined by the dialogue interface.

18. The method of claim 12, wherein the step of simulating the end user includes having the second person provide a response to the output.

19. The method of claim 12, wherein the step of refining the dialogue interface includes modifying the proposed dialogue interface to incorporate the response from the second person into the proposed dialogue interface.

20. The method of claim 12, wherein the step of simulating the automated system includes providing at least one of an audible output and a visual output to the second person through the dialogue interface.

21. The method of claim 12, wherein the step of simulating the end user includes having the second person provide input to the dialogue interface using at least one of the following: a touch-pad, an electronic pen, a mandible-operated input device, a voice interface, an audible-sound interface, a graphic user interface, and a DTMF interface.

22. The method of claim 12, wherein the step of refining the dialogue interface includes repeating steps (c) through (g) until the dialogue design is fully evaluated.

23. A method of developing a computer-based dialogue interface for an automated system the dialogue interface being disposed between the automated system and an end user, the dialogue interface receiving input from the end user and providing output to the end user in response to the input, the method comprising the steps of:

(a) defining a plurality of requirements applicable to the dialogue interface;
(b) designing the dialogue interface to meet the requirements;
(c) simulating the automated system with at least a first person;
(d) simulating the end user with at least a second person;
(e) evaluating the dialogue interface by facilitating interaction between the first and second persons through the dialogue interface;
(f) evaluation the dialogue interface based on the interaction between the first and the second persons;
(g) refining the dialogue interface based on the evaluation of the dialogue interface; and
(h) after performing steps (c) through (g) developing the automated system based upon the dialogue interface;
wherein the step of designing the dialogue interface includes mapping each output to at least one expected response.

24. The method of claim 23, wherein the step of designing the dialogue interface includes defining a plurality of outputs in the dialogue interface, the dialogue interface specifying information to be elicited from the end user by the outputs, and the outputs originating from the automated system and being directed to the end user.

25. The method of claim 24, wherein the step of defining a plurality of outputs includes defining a first output to seek the information in a first fashion and defining at least a second output to seek the information in at least a second fashion.

26. The method of claim 24, wherein the step of defining a plurality of outputs includes defining a first output to seek the information in a first fashion and defining at least a second output to seek the information in at least a second fashion that is customized and specific to the end user.

27. The method of claim 23, wherein the step of designing the dialogue interface includes optionally defining a plurality of expected responses to the outputs in the dialogue interface.

28. The method of claim 23, wherein the step of simulating the automated system includes having the first person direct a output to the second person to seek information from the second person, the output being defined by the dialogue interface.

29. The method of claim 23, wherein the step of simulating the end user includes having the second person provide a response to the output.

30. The method of claim 23, wherein the step of refining the dialogue interface includes modifying the proposed dialogue interface to incorporate the response from the second person into the proposed dialogue interface.

31. The method of claim 23, wherein the step of simulating the automated system includes providing at least one of an audible output and a visual output to the second person through the dialogue interface.

32. The method of claim 23, wherein the step of simulating the end user includes having the second person provide input to the dialogue interface using at least one of the following: a touch-pad, an electronic pen, a mandible-operated input device, a voice interface, an audible-sound interface, a graphic user interface, and a DTMF interface.

33. The method of claim 23, wherein the step of refining the dialogue interface includes repeating steps (c) through (g) until the dialogue design is fully evaluated.

34. A method of developing a computer-based dialogue interface for an automated system, the dialogue interface being disposed between the automated system and an end user the dialogue interface receiving input from the end user and providing output to the end user in response to the input, the method comprising the steps of
(a) defining a plurality of requirements applicable to the dialogue interface;
(b) designing the dialogue interface to meet the requirements;
(c) simulating the automated system with at least a first person;
(d) simulating the end user with at least a second person;
(e) evaluating the dialogue interface by facilitating interaction between the first and second persons through the dialogue interface;
(f) evaluation the dialogue interface based on the interaction between the first and the second persons;
(g) refining the dialogue interface based on the evaluation of the dialogue interface; and
(h) after performing steps (c) through (g), developing the automated system based upon the dialogue interface;
wherein the step of evaluating the dialogue interface includes comparing the response from the second person to at least one expected response defined by the proposed dialogue interface.

35. The method of claim 34, herein the step of designing the dialogue interface includes defining a plurality of outputs in the dialogue interface, the dialogue interface specifying information to be elicited from the end user by the outputs, and the outputs originating from the automated system and being directed to the end user.

36. The method of claim 35, wherein the step of defining a plurality of outputs includes defining a first output to seek the information in a first fashion and defining at least a second output to seek the information in at least a second fashion.

37. The method of claim 35, wherein the step of defining a plurality of outputs includes defining a first output to seek the information in a first fashion and defining at least a second output to seek the information in at least a second fashion that is customized and specific to the end user.

38. The method of claim 34, wherein the step of designing the dialogue interface includes optionally defining a plurality of expected responses to the outputs in the dialogue interface.

39. The method of claim 34, wherein the step of simulating the automated system includes having the first person direct a output to the second person to seek information from the second person, the output being defined by the dialogue interface.

40. The method of claim 34, wherein the step of simulating the end user includes having the second person provide a response to the output.

41. The method of claim 34, wherein the step of refining the dialogue interface includes modifying the proposed dialogue interface to incorporate the response from the second person into the proposed dialogue interface.

42. The method of claim 34, wherein the step of simulating the automated system includes providing at least one of an audible output and a visual output to the second person through the dialogue interface.

43. The method of claim 34, wherein the step of simulating the end user includes having the second person provide input to the dialogue interface using at least one of the following: a touch-pad, an electronic pen, a mandible-operated input device, a voice interface, an audible-sound interface, a graphic user interface, and a DTMF interface.

44. The method of claim 34, wherein the step of refining the dialogue interface includes repeating steps (c) through (g) until the dialogue design is fully evaluated.

45. A method of developing a computer-based dialogue interface for an automated system, the dialogue interface being disposed between the automated system and an end user, the dialogue interface receiving input from the end user and providing output to the end user in response to the input, the method comprising the steps of:

(a) defining a plurality of requirements applicable to the dialogue interface;

(b) designing the dialogue interface to meet the requirements;

(c) simulating the automated system with at least a first person;

(d) simulating the end user with at least a second person;

(e) evaluating the dialogue interface by facilitating interaction between the first and second persons through the dialogue interface;

(f) evaluation the dialogue interface based on the interaction between the first and the second persons;

(g) refining the dialogue interface based on the evaluation of the dialogue interface; and (h) after performing steps (c) through (g), developing the automated system based upon the dialogue interface;

wherein the step of refining the dialogue interface includes modifying the output based on a difference between the at least one expected response and the response from the second person.

46. The method of claim 45, wherein the step of designing the dialogue interface includes defining a plurality of outputs in the dialogue interface, the dialogue interface specifying information to be elicited from the end user by the outputs, and the outputs originating from the automated system and being directed to the end user.

47. The method of claim 46, wherein the step of defining a plurality of outputs includes defining a first output to seek the information in a first fashion and defining at least a second output to seek the information in at least a second fashion.

48. The method of claim 46, wherein the step of defining a plurality of outputs includes defining a first output to seek the information in a first fashion and defining at least a second output to seek the information in at least a second fashion that is customized and specific to the end user.

49. The method of claim 45, wherein the step of designing the dialogue interface includes optionally defining a plurality of expected responses to the outputs in the dialogue interface.

50. The method of claim 45, wherein the step of simulating the automated system includes having the first person direct a output to the second person to seek information from the second person, the output being defined by the dialogue interface.

51. The method of claim 45, wherein the step of simulating the end user includes having the second person provide a response to the output.

52. The method of claims 45, wherein the step of refining the dialogue interface includes modifying the proposed dialogue interface to incorporate the response from the second person into the proposed dialogue interface.

53. The method of claim 45, wherein the step of simulating the automated system includes providing at least one of an audible output and a visual output to the second person through the dialogue interface.

54. The method of claim 45, wherein the step of simulating the end user includes having the second person provide input to the dialogue interface using at least one of the following: a touch-pad, an electronic pen, a mandible-operated input device, a voice interface, an audible-sound interface, a graphic user interface, and a DTMF interface.

55. The method of claim 45, wherein the step of refining the dialogue interface includes repeating steps (c) through (g) until the dialogue design is fully evaluated.

* * * * *